T. E. MURRAY.
METHOD OF ELECTRIC WELDING.
APPLICATION FILED MAR. 28, 1918.

1,291,601.

Patented Jan. 14, 1919.

Inventor
Thomas E. Murray
By his Attorney

UNITED STATES PATENT OFFICE.

THOMAS E. MURRAY, OF NEW YORK, N. Y.

METHOD OF ELECTRIC WELDING.

1,291,601.   Specification of Letters Patent.   Patented Jan. 14, 1919.

Application filed March 28, 1918. Serial No. 225,159.

*To all whom it may concern:*

Be it known that I, THOMAS E. MURRAY, a citizen of the United States, residing at New York, in the county of New York and State of New York, have invented a certain new and useful Improvement in Methods of Electric Welding, of which the following is a specification.

The invention is a method of coupling end to end metal pipes, rods or the like by electrical arc welding.

In the accompanying drawings—

Figure 1:
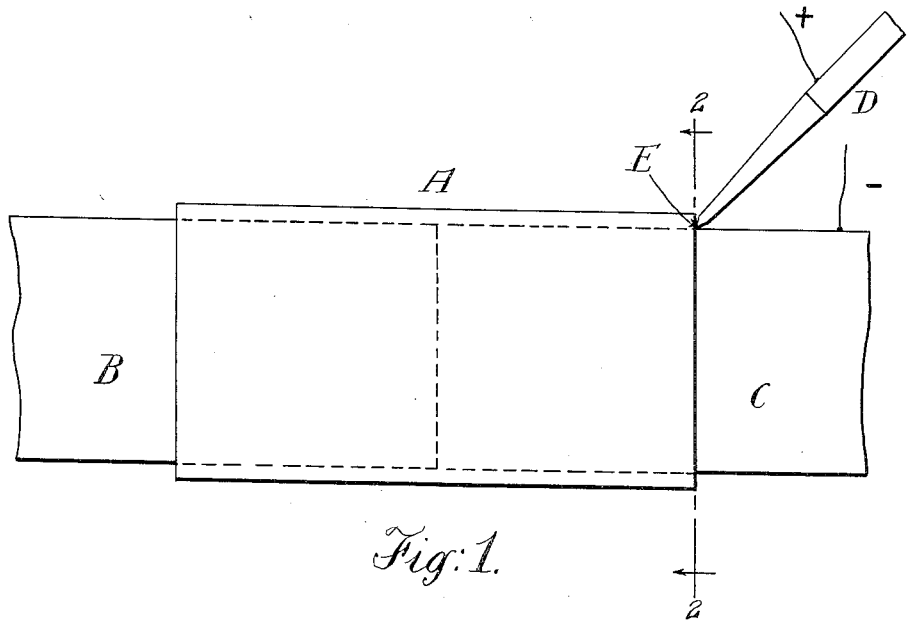
Figure 2:
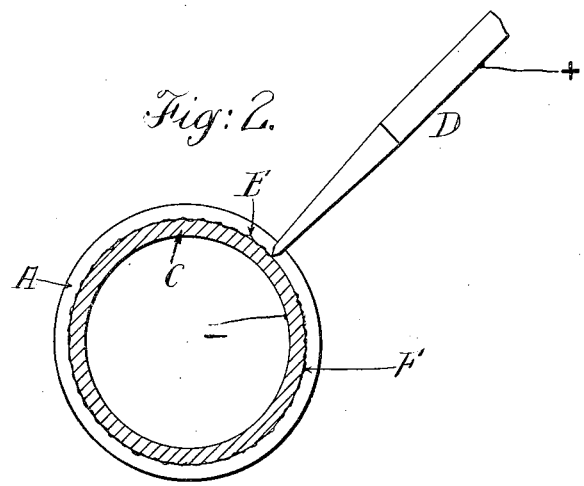

Figure 1 is an elevation of a coupling sleeve and two pipes having their end portions fitting therein, and also showing the movable electrode, whereby the joint between the said sleeve and pipes is welded. Fig. 2 is an enlarged section on the line 2, 2 of Fig. 1, showing the formation of the aforesaid weld.

Similar letters of reference indicate like parts.

A is a sleeve, into which the end portions of the pipes B, C enter and fit. The said pipes form one terminal of a welding circuit. To the other terminal is connected an electrode D, preferably pointed or tapered, so that it can be introduced into the angle between the surface of either pipe, as C, and an end face, as E, of the sleeve A. The current being established, the operator manually carries the electrode D around the edge of the joint between sleeve A and pipe C, thus welding said parts together, as indicated at F, Fig. 2, closing the joint between said sleeve and said pipe, and so uniting said sleeve and said pipe. The same operation is performed at the opposite end of the sleeve, so that said sleeve thus becomes united to both pipes, and so couples said pipes together.

It will be observed that by this method I produce at the ends of the sleeve and from the metal thereof two encircling ribs which unite the sleeve to the pipes, which close the joints at the ends of the sleeve completely and which form strengthening bands in the angles between pipes and sleeve ends.

I claim:

The method of coupling end to end two metal bodies of the type set forth, which consists in, first, introducing said bodies into opposite ends of a sleeve, and, second, arc welding the metal of the end faces of said sleeve to said bodies, whereby the fused metal is caused to close the joints at said sleeve ends and to unite said sleeve to said bodies.

In testimony whereof I have affixed my signature in presence of two witnesses.

THOMAS E. MURRAY.

Witnesses:
GERTRUDE T. PORTER,
MAY T. MCGARRY.